(12) United States Patent
Orlick et al.

(10) Patent No.: US 11,328,131 B2
(45) Date of Patent: May 10, 2022

(54) REAL-TIME CHAT AND VOICE TRANSLATOR

(71) Applicants: Jordan Abbott Orlick, Chatsworth, CA (US); Matthew Jason Weisman, West Hills, CA (US); Collin Javon Alford, Jr., Miami, FL (US)

(72) Inventors: Jordan Abbott Orlick, Chatsworth, CA (US); Matthew Jason Weisman, West Hills, CA (US); Collin Javon Alford, Jr., Miami, FL (US)

( * ) Notice: Subject to any disclaimer, the term of this patent is extended or adjusted under 35 U.S.C. 154(b) by 38 days.

(21) Appl. No.: 16/299,875

(22) Filed: Mar. 12, 2019

(65) Prior Publication Data

US 2020/0293622 A1   Sep. 17, 2020

(51) Int. Cl.
| | |
|---|---|
| *G06F 40/58* | (2020.01) |
| *H04L 51/046* | (2022.01) |
| *G10L 15/00* | (2013.01) |
| *G10L 15/26* | (2006.01) |

(52) U.S. Cl.
CPC ............ *G06F 40/58* (2020.01); *G10L 15/005* (2013.01); *G10L 15/26* (2013.01); *H04L 51/046* (2013.01)

(58) Field of Classification Search
CPC ....................... G06F 40/40–58; G06F 16/3337
USPC ........................................................ 704/2–8
See application file for complete search history.

(56) References Cited

U.S. PATENT DOCUMENTS

| 10,599,786 | B1 * | 3/2020 | Malcangio | G06F 40/58 |
|---|---|---|---|---|
| 2006/0271352 | A1 * | 11/2006 | Nikitin | G06F 40/58 704/9 |
| 2011/0246172 | A1 * | 10/2011 | Liberman | G06F 40/58 704/2 |
| 2011/0282645 | A1 * | 11/2011 | Khuda | H04L 51/063 704/3 |
| 2014/0236566 | A1 * | 8/2014 | Schreier | G06Q 30/08 704/2 |
| 2016/0078020 | A1 * | 3/2016 | Sumita | G10L 15/26 704/9 |
| 2016/0203126 | A1 * | 7/2016 | Zhu | G06K 7/1439 704/3 |
| 2018/0121423 | A1 * | 5/2018 | Orsini | G10L 13/08 |

* cited by examiner

*Primary Examiner* — Jesse S Pullias
(74) *Attorney, Agent, or Firm* — Seyfarth Shaw LLP; Alan M. Lenkin (57) ABSTRACT

A method for translating messages between users is presented. The method includes receiving, at a first computing device, a message from a first user associated with a first language, in which content of the message is in the first language. The method also includes transmitting the message to a second computing device associated with a second language of a second user. The method further includes receiving the message and an indication of the second language from the second computing device as well as transmitting the message to a translation server to be translated to the second language. Furthermore, the method includes receiving a translated message from the translation server and transmitting the translated message to the second computing device of the second user.

8 Claims, 8 Drawing Sheets

REAL-TIME CHAT AND VOICE TRANSLATOR

TECHNICAL FIELD

The present disclosure generally relates to translating messages between users. More specifically, the present disclosure relates to translating chat or voice communications between two or more users.

BACKGROUND

As globalization continues to increase, it is increasingly likely that communication will cross national boundaries, and as a result, users will encounter language barriers when communicating with each other. There are several systems currently available for addressing such language barriers. In one system, remote servers perform translation. For example, a client device can send an entire message to a server equipped with translation software. The server then translates the message and sends it back to the client device in a translated form. The user of the client device then transmits the message in its translated form to the intended destination device. While this form of message translation can be effective, the time required to perform this process makes this implementation impractical for "real-time" (instant) communication.

SUMMARY

In one aspect of the present disclosure, a method for translating messages between users is disclosed. The method includes receiving, at a first computing device, a message from a first user associated with a first language, in which content of the message is in the first language. The method also includes transmitting the message to a second computing device associated with a second language of a second user. The method further includes receiving the message and an indication of the second language from the second computing device as well as transmitting the message to a translation server to be translated to the second language. Furthermore, the method includes receiving a translated message from the translation server and transmitting the translated message to the second computing device of the second user.

In another aspect of the present disclosure, a method for translating messages between users is disclosed. The method includes receiving a message from a first user associated with a first language, in which content of the message is in the first language. The method also includes receiving, from a first computing device, an indication of a second language associated with a second computing device of a second user. The method further includes transmitting the message and the indication of the second language to a translation server for translating the message to the second language as well as receiving a first translated message from the translation server. Furthermore, the method includes transmitting the first translated message to the first computing device. The first translated message is intended to be transmitted by the first computing device to the second computing device.

Another aspect of the present disclosure is directed to an apparatus for translating messages between users. The apparatus having a memory and one or more processors coupled to the memory. The processor(s) is configured to receive, at a first computing device, a message from a first user associated with a first language, in which content of the message is in the first language. The processor(s) is also configured to transmit the message to a second computing device associated with a second language of a second user. The processor(s) is also configured to receive the message and an indication of the second language from the second computing device. The processor(s) is also configured to transmit the message to a translation server to be translated to the second language. Further, the processor(s) is configured to receive a translated message from the translation server. Furthermore, the processor(s) is configured to transmit the translated message to the second computing device of the second user.

Yet another aspect of the present disclosure is directed to an apparatus for translating messages between users. The apparatus having a memory and one or more processors coupled to the memory. The processor(s) is configured to receive a message from a first user associated with a first language, in which content of the message is in the first language. The processor(s) is also configured to receive, from a first computing device, an indication of a second language associated with a second computing device of a second user. The processor(s) is also configured to transmit the message and the indication of the second language to a translation server for translating the message to the second language. The processor(s) is further configured to receive a first translated message from the translation server. Furthermore, the processor(s) is further configured to transmit the first translated message to the first computing device. The first translated message is intended to be transmitted by the first computing device to the second computing device.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

As the effects of globalization continues to increase around the world, it is increasingly likely that communication will cross national boundaries As a result, users will encounter language barriers when communicating with each other.

There are several systems currently available for addressing such language barriers. In one system, remote servers perform translation. For example, a client device can send an entire message to a server equipped with translation software. The server then translates the message and sends it back to the client device in a translated form. The user of the client device then transmits the message in its translated form to the intended destination device. While this form of message translation can be effective, the time required to perform this process makes this implementation impractical for "real-time" (instant) communication. This is because conventional forms of message translation specify significant processing and network resources.

For example, conventional systems store multiple copies of a message from a user as well as multiple copies of a translation of the message in one or more languages, which further increases latency of the translation process. Moreover, conventional systems simultaneously translate a message from a user into multiple languages when the user is communicating with multiple users, which further reduces the speed of the translation. Thus, it is desirable to improve translation speed.

Aspects of the present disclosure are directed to real-time voice/chat translation processing for increasing translation speed by freeing up computational resources. A method or system is described for translating a phone call or chat between multiple users where the multiple users communicate in their preferred language in substantially real-time. For example, the chat or voice call may be between two or more users.

In one aspect, a first user is communicating with one or more users. Each of the users are speaking a different language. For example, the first user talks to the other users in English via a microphone of a first computing device (e.g., a mobile phone or user equipment). In one aspect, audio from the first user is translated or converted to text at the computing device of the first user via a voice-to-text translator. The text is then received at a real-time translator server (RTT server) (e.g., real-time translator chat/voice server). In contrast to conventional systems, the RTT server does not translate the text to a specific language immediately. Rather, prior to the translation, the RTT server sends the English message to each recipient to avoid translating the English language to multiple languages simultaneously.

Each of the recipients then sends the received English message and an indication of their respective preferred language back to the RTT server for translation, either in the RTT server and/or in a translation server. For example, a second user receives the English message and sends the message to the RTT server along with a language (French) associated with a second computing device used by the second user. The second language may be based on a native language set for the second computing device. The RTT server then forwards the English message to the translation server indicating that the message should be translated from English to French.

Similarly, the other users of the multiple users send the message and an indication of their preferred language at different times for translation. Translating the message to the different languages of the multiple users at different times frees up computational resources at both the translation server and the RTT server, thereby improving latency of the translation.

The translation server returns the translated message to the RTT server, which then passes the message to the second computing device associated with the second user. In one aspect, the second computing device then converts the translated text to translated audio and outputs the translated audio to the second user. The process then repeats for the other users.

Aspects of the present disclosure improve translation efficiency and latency because the first user does not need to know what languages to which it needs to translate. Rather, it simply sends the message and the translation language is determined based on the computing device (e.g., the second computing device) of the receiving user.

In some aspects, the audio or the text data from the first user is stored in memory at the first computing device or at the RTT server without storing any translated messages. The untranslated audio or text data is stored in memory only once to improve the speed of the translation by freeing up computational resources.

Figure 1:
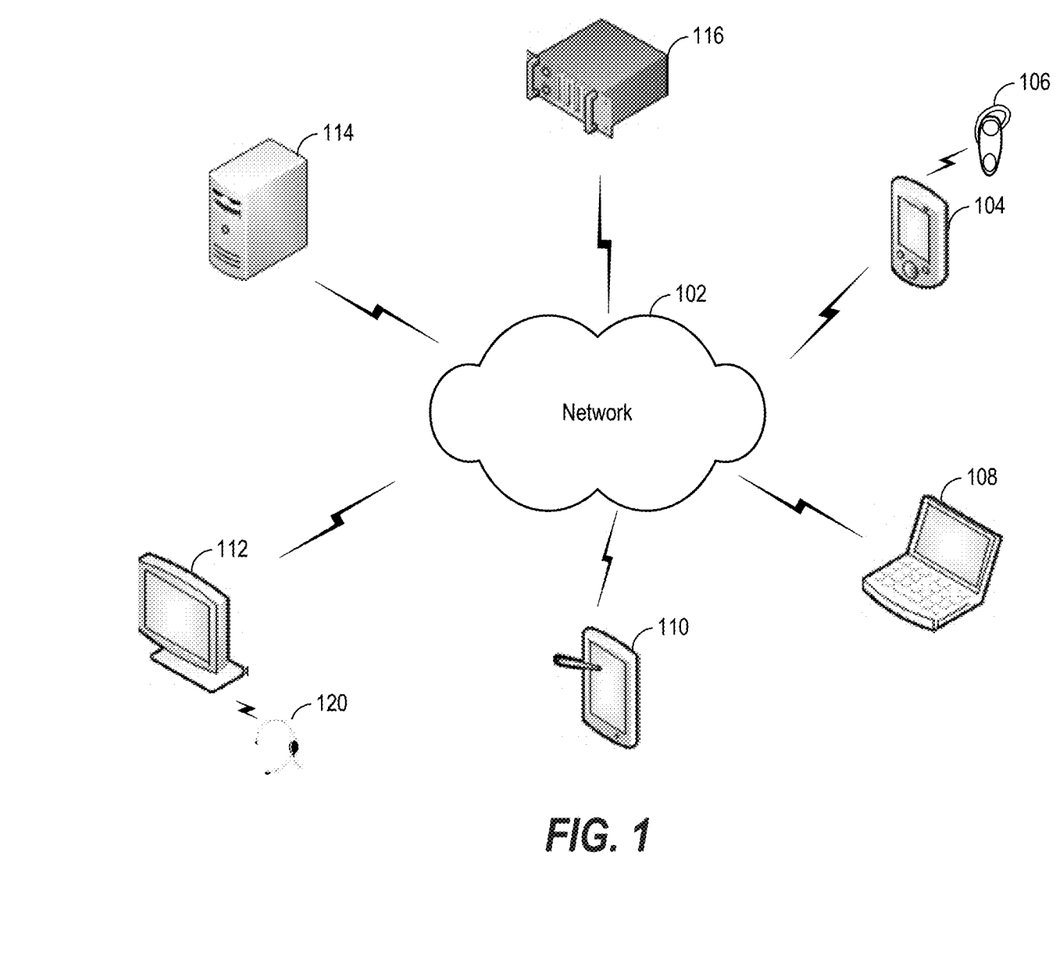
FIG. 1 illustrates a computer network for use with real-time translator processing, according to one aspect of the present disclosure.

FIG. 1 illustrates a computer network 102 for use with real-time translator processing, according to one aspect of the present disclosure. Multiple computing devices (e.g., mobile devices or user equipments) engaging in real-time voice/chat translation processing may be connected over a network. As shown in FIG. 1, multiple devices may be connected over the network 102. The network 102 may include a local or private network or may include a wide network such as the Internet. Devices may be connected to the network 102 through either wired or wireless connections. For example, a wireless device 104 may be connected to the network 102 through a wireless service provider. Other devices, such as computer 112, may connect to the network 102 through a wired connection. Other devices, such as a laptop 108 or tablet computer 110 may be capable of connecting to the network 102 using various connection methods including through a wireless service provider, over a WiFi connection, or the like. Networked devices may output synthesized speech through a number of audio output devices including headsets 106 or 120. Audio output devices may be connected to networked devices either through a wired or wireless connection. Networked devices may also include embedded audio output devices, such as an internal speaker in the laptop 108, wireless device 104, or table computer 110.

In certain system configurations, a combination of devices may be used. For example, one device may receive text, another device may process text into speech, and still another device may output the speech to a user. For example, text may be received by a wireless device 104 and sent to a computer 114 or server 116 for translation processing and/or text-to-voice or voice-to-text processing. The resulting audio data may be returned to the wireless device 104 for output through the headset 106. Alternatively, the computer 112 may partially process the text before sending it over the network 102.

Figure 2:
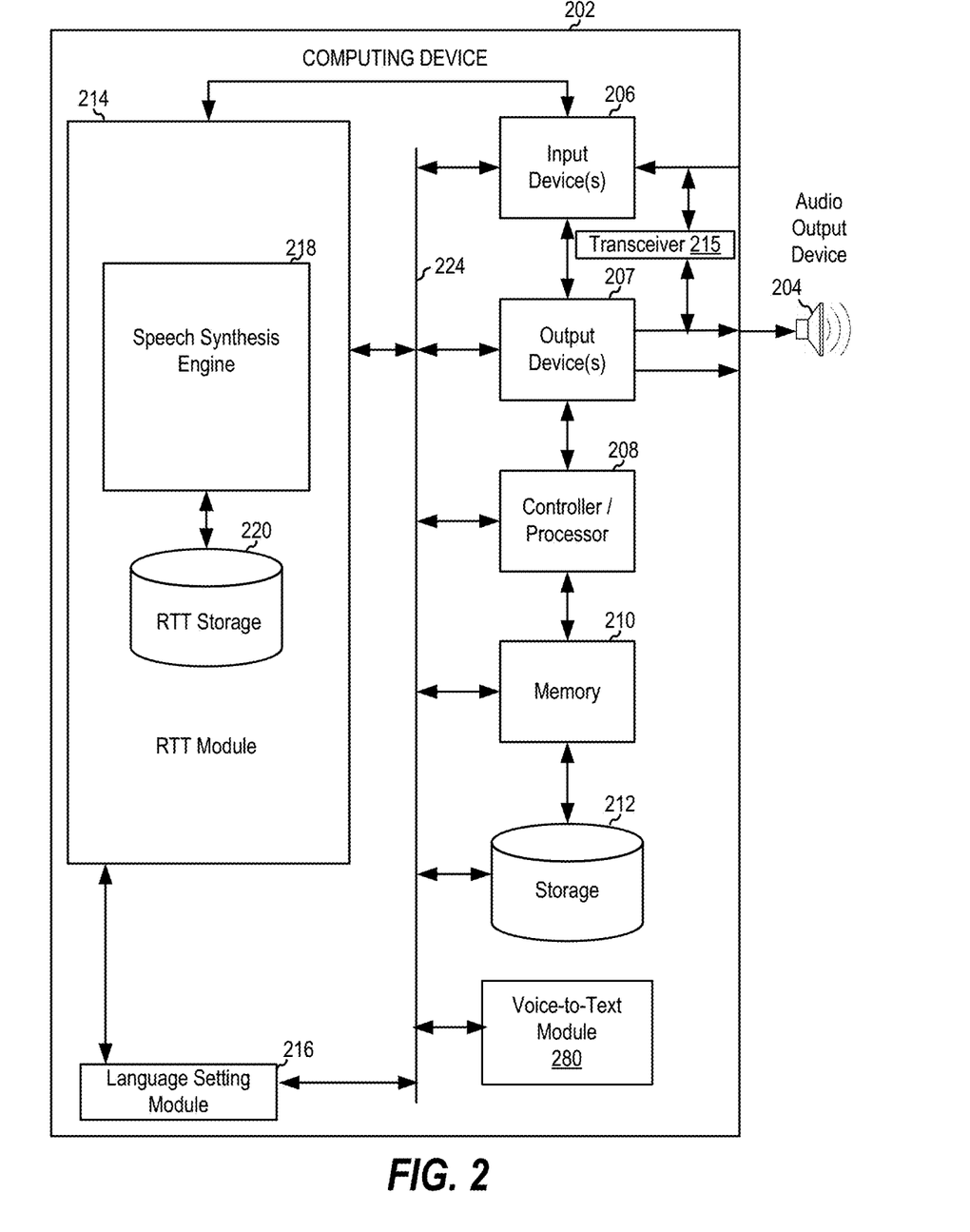
FIG. 2 is a block diagram conceptually illustrating a computing device, according to one aspect of the present disclosure.

FIG. 2 is a block diagram conceptually illustrating a computing device 202, according to one aspect of the present disclosure. Aspects of the present disclosure include computer-readable and computer-executable instructions that may reside on the computing device 202. FIG. 2 illustrates a number of components that may be included in the computing device 202, however other non-illustrated components may also be included. Additionally, some of the illustrated components may not be present in every device capable of employing aspects of the present disclosure. Further, some components that are illustrated in the computing device 202 as a single component may also appear multiple times in a single device.

For example, the computing device 202 may include multiple input devices 206, output devices 207, or multiple controllers/processors 208. The computing device 202 may include real-time chat/voice translation features. For example, the computing device 202 may include a real-time translator (RTT) module 214 (e.g., a real-time-chat/voice translator module) to facilitate real-time chat/voice translation. In one aspect, audio of a response in a language that is different from a language used by a user of another computing device may be stored in RTT storage 220 (or a memory 210 or data storage component 212) of the computing device 202. The computing device 202 further includes a voice-to-text module 280 for converting voice to text and vice versa.

The computing device 202 also includes a transceiver 215. The transceiver 215 is coupled to one or more antennas (not shown). The transceiver 215 enables the computing device 202 to communicate (e.g., transmit to and receive from other computing devices and servers including a translation server and RTT server) with various other apparatus over a transmission medium (e.g., the network 102).

The aspects of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The aspects of the present disclosure may also be applied to home appliances (such as refrigerators, ovens, etc.), vehicles (such as cars, buses, motorcycles, etc.), and/or ebook readers, for example.

As illustrated in FIG. 2, the computing device 202 may include an audio output device 204 for outputting speech or voice to a server (e.g., an RTT server, a translation server and/or a voice-to-text server) processed by the computing device 202. The audio output device 204 may include a speaker, headphone, or other suitable component for emitting sound. The audio output device 204 may be integrated into the computing device 202 or may be separate from the computing device 202. The computing device 202 may also include an address/data bus 224 for conveying data among components of the computing device 202. Each component within the computing device 202 may also be directly connected to other components in addition to (or instead of) being connected to other components across the bus 224. Although certain components are illustrated in FIG. 2 as directly connected, these connections are illustrative only and other components may be directly connected to each other (such as the RTT module 214 to the controller/processor 208).

The computing device 202 may include a controller/processor 208 that may be a central processing unit (CPU) for processing data and computer-readable instructions and the memory 210 for storing data and instructions. The memory 210 may include volatile random access memory (RAM), non-volatile read only memory (ROM), and/or other types of memory. The computing device 202 may also include the data storage component 212 for storing data and instructions. The data storage component 212 may include one or more storage types such as magnetic storage, optical storage, solid-state storage, etc.

The computing device 202 may also be connected to removable or external memory and/or storage (such as a removable memory card, memory key drive, networked storage, etc.) through the input device 206 or the output device 207. Computer instructions for processing by the controller/processor 208 for operating the computing device 202 and its various components may be executed by the controller/processor 208 and stored in the memory 210, storage 212, external device, or in RTT memory/storage 220 included in the RTT module 214. Alternatively, some or all of the executable instructions may be embedded in hardware or firmware in addition to or instead of software. The aspects of this disclosure may be implemented in various combinations of software, firmware, and/or hardware, for example.

The computing device 202 includes the input device(s) 206 and the output device(s) 207. A variety of input/output device(s) may be included in the device. Example input devices include an audio output device 204, such as a microphone, a touch input device, a keyboard, a mouse, a stylus or other input devices. Example output devices include a visual display, a tactile display, audio speakers, headphones, printer, or other output device. The input device(s) 206 and/or output device(s) 207 may also include an interface for an external peripheral device connection such as universal serial bus (USB), FireWire, Thunderbolt or other connection protocol. The input device(s) 206 and/or output device(s) 207 may also include a network connection such as an Ethernet port, modem, etc.

The input device(s) 206 and/or output device(s) 207 may also include a wireless communication device, such as radio frequency (RF), infrared, Bluetooth, wireless local area network (WLAN) (such as WiFi), or wireless network radio, such as a radio capable of communication with a wireless communication network such as a long term evolution (LTE) network, 3G network, 4G network, 5G network, etc. Through the transceiver 215, the input device(s) 206, the output device(s) 207, and/or the computing device 202 may connect to a network, such as the Internet or private network, which may include a distributed computing environment.

The computing device 202 may include a real-time translator module 214 (RTT module). For example, in some aspects, the RTT module 214 may process at least a portion of audio (e.g., audio waveforms including speech) from a user into text (e.g., textual data) before transmitting to an RTT server or a translation server. The RTT module 214 may be connected to the bus 224, input device(s) 206, output device(s) 207, transceiver 215, audio output device 204, controller/processor 208, and/or other components of the computing device 202. The text or audio may be in the form of sentences, phrases, or words that are provided to a server to facilitate translation of the sentences, phrases, or words in a different language.

In one aspect, the computing device 202 (e.g., the RTT module 214) detects a pause or break in the phone call audio and automatically sends at least a portion of the audio/voice already received to the voice-to-text server (e.g., server 116) or to a translation server via the RTT server based on the pause. For example, the pause may indicate the end of a segment of speech. In some aspects, control features (e.g., buttons) may be included in the computing device 202 to start/stop recording of a user's speech or voice. The control features may also include an option to play a voice recording or an option to hear a translated computer voice. These control features may be implemented in the RTT module 214 or may be separate but coupled to the RTT module 214.

For example, the RTT module 214 may determine whether to transmit a message to the server after each word or after each phrase based on a language associated with the computing device 202. In one aspect, the language associated with the computing device 202 may be detected based on a language setting in a language setting module 216 and communicated to the RTT module 214. The RTT module 214 communicates an indication of the language associated with the computing device 202 or a language associated with another computing device to the server (e.g., the RTT server. In one aspect, the RTT module 214 decides when to transmit text or audio after each phrase, for example, to account for non-Latin based languages. Sending a message after each word speeds up the translation process such that the voice/chat translation is in real-time, resembling a normal conversation.

The RTT module 214 includes a speech synthesis engine 218, and the RTT storage 220. The speech synthesis engine 218 compares annotated phonetic unit models and information stored in the RTT storage 220 for converting the audio into text or vice versa. The phonetic units may be phonemes (individual sounds), half-phonemes, di-phones (the last half of one phoneme coupled with the first half of the adjacent phoneme), bi-phones (two consecutive phonemes), syllables, words, phrases, sentences, or other units. The speech synthesis engine 218 may include its own controller(s)/processor(s) and memory or may use the controller/processor 208 and memory 210 of the computing device 202, for example. Similarly, the instructions for operating the speech synthesis engine 218 may be located within the RTT module 214, within the memory 210, and/or storage 212 of the computing device 202, or within an external device.

In one aspect, the speech synthesis engine 218, also known as a synthesizer, is used for converting speech or to facilitate conversion of text into an audio waveform for output to an audio output device 204 and eventually to a user. The speech synthesis engine 218 converts the input text into high-quality natural-sounding speech in an efficient manner. Such high-quality speech may sound as much like a human speaker as possible, or may be understandable to a listener without attempts to mimic a human voice.

Figure 3:
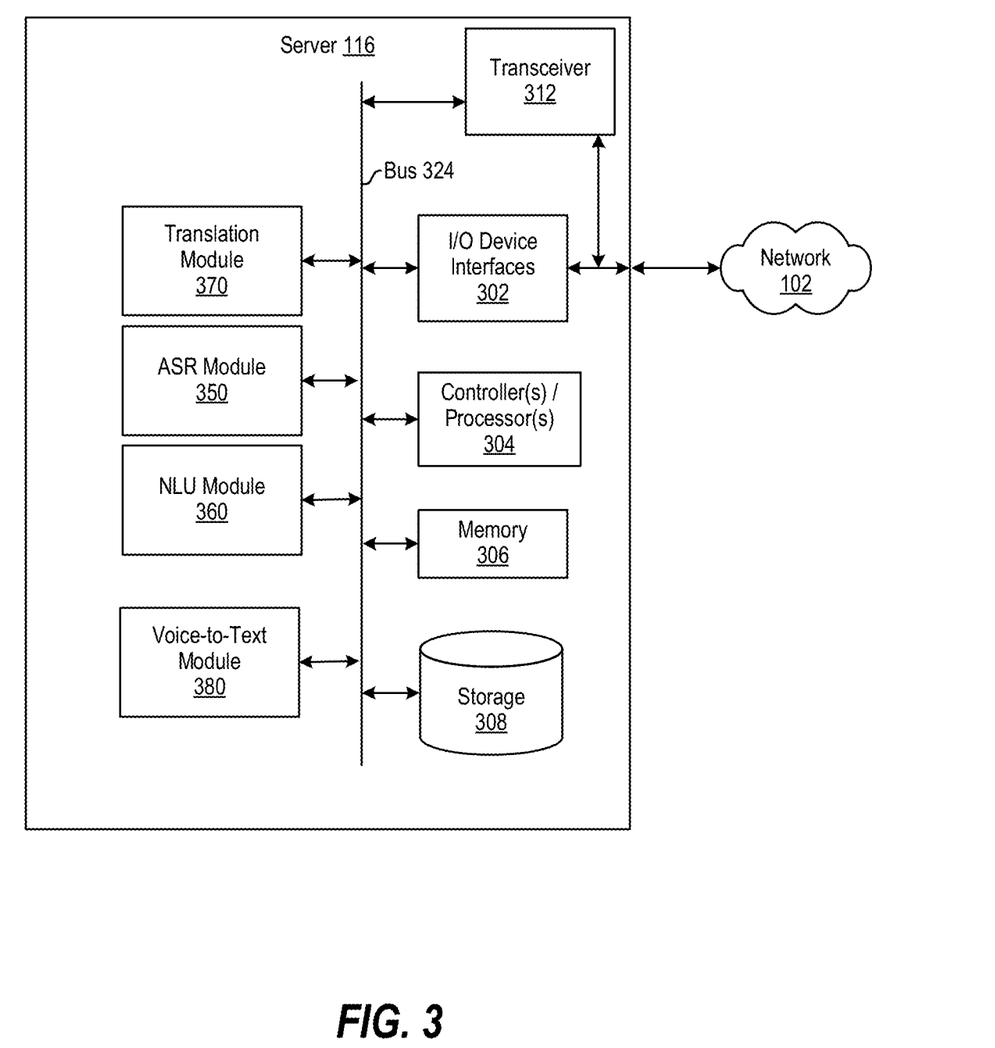
FIG. 3 is a block diagram conceptually illustrating example components of a server, according to aspects of the present disclosure.

FIG. 3 is a block diagram conceptually illustrating example components of a remote device, such as a remote server 116 (shown in FIG. 1) that may assist with automatic speech recognition (ASR), natural language understanding (NLU) processing, command processing, real-time chat/voice translation, and/or voice-to-text/text-to-voice processing. Multiple such servers 116 may be included in a system, such as one server 116 for training ASR models, one server 116 for performing ASR, one server 116 for performing NLU, another server 116 for voice-to-text/text-to-voice processing, another server 116 for real-time chat/voice translation, and a server 116 dedicated to translation, etc. In operation, the server 116 may include computer-readable and computer-executable instructions that reside on the server 116.

The server 116 may also include a translation module 370 for translating text from a first language to a second different language. Processing in the server 116 may be performed by an ASR module 350, an NLU module 360, a translation module 370, or other components of the server 116 connected via the network 102. The server 116 further includes a voice-to-text module 380 for converting voice to text and vice versa.

The server 116 may include one or more controllers/processors 304 that may each include a central processing unit (CPU) for processing data and computer-readable instructions and a memory 306 for storing data and instructions of the respective device. The memories 306 may individually include volatile random access memory (RAM), non-volatile read only memory (ROM), non-volatile magnetoresistive (MRAM), and/or other types of memory. The server 116 also includes a data storage component 308, for storing data (e.g., audio) and controller/processor-executable instructions. Each data storage component may individually include one or more non-volatile storage types such as magnetic storage, optical storage, solid-state storage, etc. The server 116 may also be connected to removable or external non-volatile memory and/or storage (such as a removable memory card, memory key drive, networked storage, etc.) through input/output device interfaces 302.

The server 116 also includes or is coupled to a transceiver 312. The transceiver 312 is coupled to one or more antennas (not shown). The transceiver 312 enables the server to communicate (e.g., transmit to and receive from the computing devices and other servers including a translation server) with various other apparatus over a transmission medium (e.g., the network 102).

Computer instructions for operating the server 116 and its various components may be executed by the controller(s)/processor(s) 304, using the memory 306 as temporary "working" storage at runtime. A device's computer instructions may be stored in a non-transitory manner in the non-volatile memory 306, the storage 308, or an external device(s). Alternatively, some or all of the executable instructions may be embedded in hardware or firmware on the respective device in addition to or instead of software.

The server 116 includes an input/output device interfaces 302. A variety of components may be connected through the input/output device interfaces 302. Additionally, the server 116 may include an address/data bus 324 for conveying data among components of the device. Each component within the server 116 may also be directly connected to other components in addition to (or instead of) being connected to other components across the bus 324.

Figure 4:
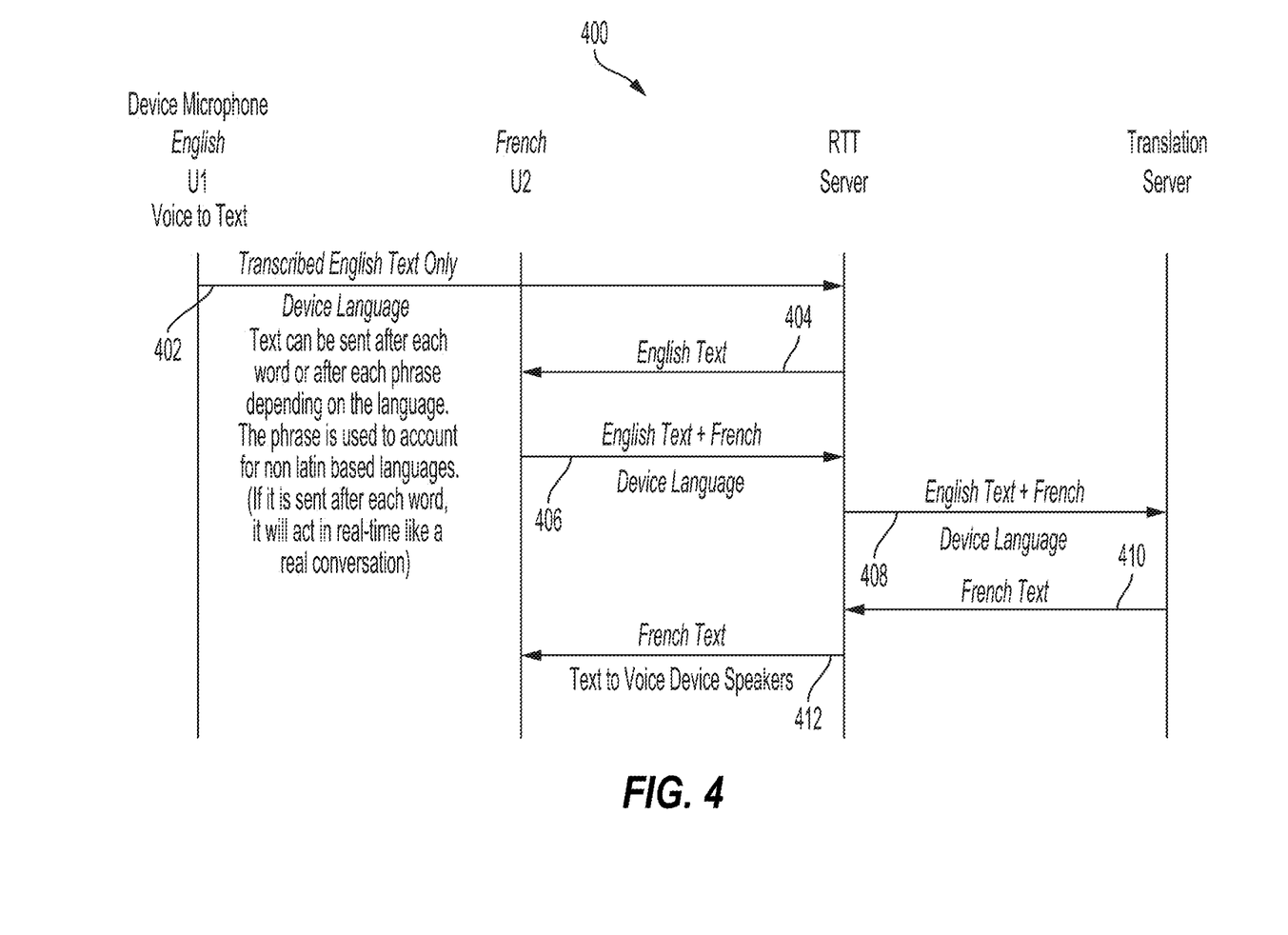
FIG. 4 is an exemplary flow diagram illustrating a method of translating a phone call between two users, according to aspects of the present disclosure.

FIG. 4 is an exemplary flow diagram 400 illustrating a method of translating a phone call between two users, according to aspects of the present disclosure. The flow diagram 400 illustrates a real-time voice translation where a first computing device and a second computing device both include RTT features, according to aspects of the present disclosure. Both computing devices include a real-time voice translation module (e.g., the RTT module 214 of FIG. 2) to facilitate communication with a real-time voice translation server. For example, each of a first user U1 using the first computing device and a second user U2 using the second computing device may subscribe to a translation service that causes the first computing device and the second computing device to operate according to aspects of the present disclosure.

A message (e.g., textual data) is generated by converting audio (e.g., voice or speech) from the first user U1 of the first computing device (e.g., a first mobile device) to text. In one aspect, the conversion from voice to text occurs at the first computing device (e.g., the computing device 202, shown in FIG. 2). Alternatively, the audio is transmitted to a server (e.g., the server 116, illustrated in FIG. 3) where the voice is converted to text by a voice-to-text module (e.g., voice-to-text module 380) of the server. The first computing device may detect a first language associated with the first user U1. For example, the detection can be based on the language setting in a language setting module 216, as shown in FIG. 2.

At time 402, the message (e.g., a transcribed English text) is transmitted to a first server (e.g., an RTT server). The message is transmitted in conjunction with an indication of the first language (e.g., English) associated with the first user U1. The content of the message is in the first language. In one aspect, the first computing device transmits the message to the first server after each word or after each phrase based on a language associated with the computing device.

In one configuration, the RTT server may count each translated word. The word count may be used for billing purposes or other purposes. For security and privacy, the RTT server does not store the translated messages.

In some aspects, the audio or the text data is stored in memory at the first computing device or at the RTT server without storing any translated messages. The untranslated audio or text data is stored in memory only once to improve the speed of the translation by freeing up computational resources.

At time 404, the first server transmits the message to the second computing device associated with a second language (e.g., French) of the second user U2. At time 406, the first server receives the message and an indication of the second language from the second computing device. The detection of the second language by the second computing device is also based on language settings in a language setting module (e.g., the language setting module 216, shown in FIG. 2) of the second computing device. At time 408, the first server transmits the message and the indication of the second language to a second server (e.g., a translation server) to translate the message to the second language. For example, the RTT server indicates to the translation server that the second language (e.g., French) is an intended translation language for the message.

At time 410, the first server receives the first translated message from the translation server. At time 412, the first server transmits the first translated message to the second computing device of the second user U2. Thus, the first user U1 does not need to know what languages to which it translates. Rather, it simply sends the message to the RTT server and the translation language is determined based on the computing device (e.g., the second computing device) of the other user Uother.

In one aspect, the translation server is a remote device. For example, the translation server is remote relative to the RTT server. In other aspects, the translation server and the RTT server are incorporated into a single server. In one aspect, the first server converts the first translated message into audio before transmitting the first translated message to the second computing device, thereby causing the audio of the first translated message to be output by the second computing device to the second user U2.

In other aspects, the first server transmits the first translated message in text, which causes the second computing device to convert the first translated message to audio and causes the audio of the first translated message to be output to the second user U2 by the second computing device. For example, the first server may transmit instructions to the second computing device to cause the second computing device to convert the translated message to audio and to output the audio of the first translated message.

Figure 5:
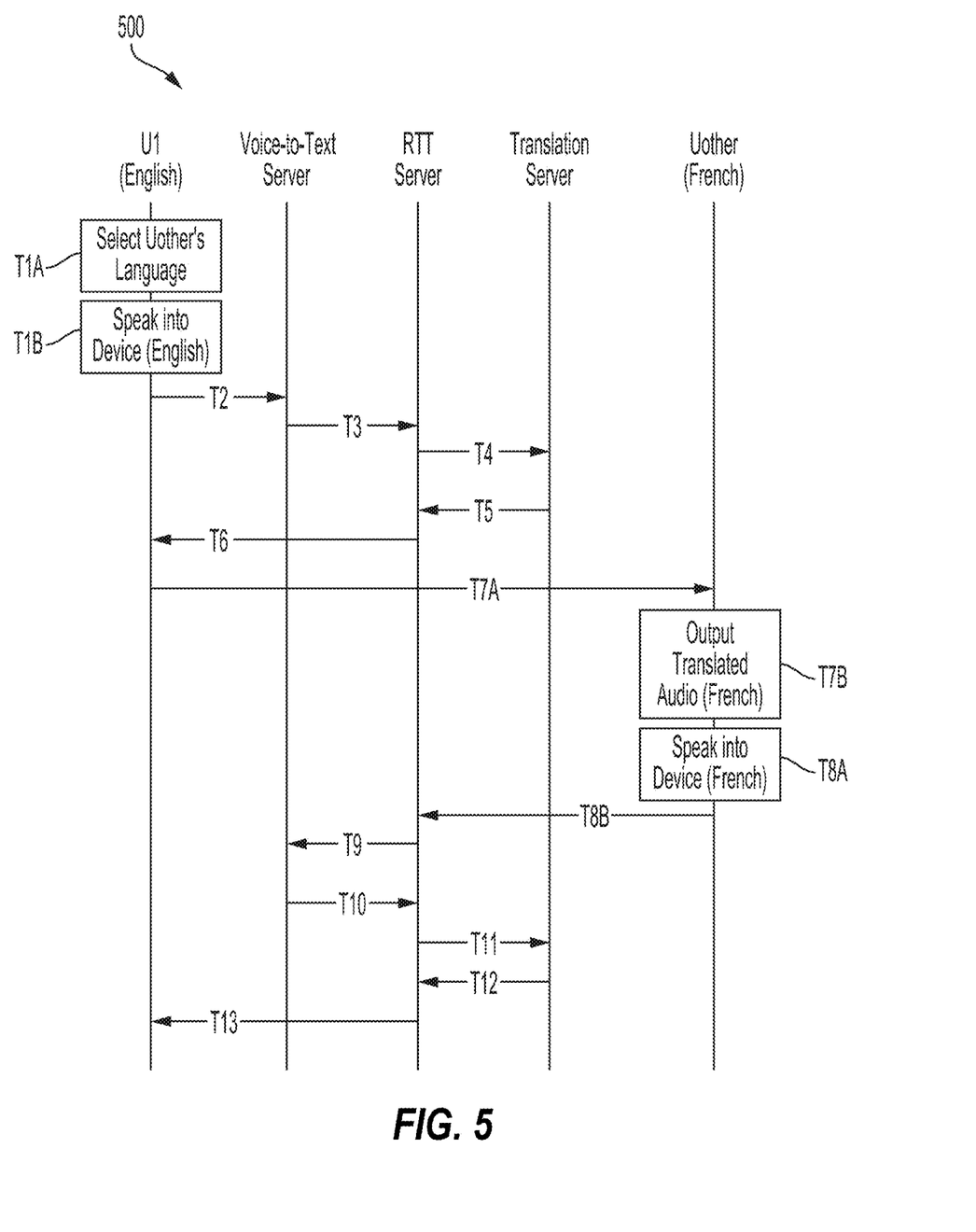
FIG. 5 is an exemplary flow diagram illustrating a method of translating a phone call between two users, according to aspects of the present disclosure.

FIG. 5 is an exemplary timing diagram 500 for translating a phone call between two users, according to aspects of the present disclosure. For illustrative purposes, some of the labeling of the devices and features of FIG. 5 are similar to those of FIG. 4. The flow diagram 500 illustrates a real-time voice translation where only the first computing device includes RTT features, according to aspects of the present disclosure.

For example, the first computing device associated with the first user U1 may include a real-time voice translation module (e.g., the RTT module 214, shown in FIG. 2). A real-time voice translation process may be performed at the first computing device to facilitate real-time voice translation according to aspects of the present disclosure. However, the other computing device (not shown) associated with another user Uother may not include the described real-time voice translation features. Alternatively, the first user U1 may subscribe to a translation service and the other user Uother is not subscribed to the translation service. The first computing device is associated with the first language (e.g., English) and the other computing device is associated with the second language (e.g., French).

The timing diagram 500 illustrates a timing for the translation when only one user subscribes to a real-time voice translation service. In one aspect, both the first user U1 and the other user Uother are communicating via a voice over Internet protocol computing device.

At time step T1A, the first user U1 selects the other user's (Uother's) language (e.g., French). The detection of the other user's language is also based on language settings in a language setting module. For example, the other user's language may be provided to the first computing device of the first user U1 by the other computing device of the other user. At time step T1B, the first user U1 speaks into the first communicating device in the first language (e.g., English). In one aspect, the audio is stored in memory and transmitted to a voice to text server at time step T2. The voice-to-text server converts the audio to text and the converted text is sent to the RTT server at time step T3. In some aspects, at least a portion of the voice-to-text conversion occurs at the first computing device and the text data is directly transmitted to the RTT server. In other aspects, the voice-to-text server may be included in the RTT server. The audio or text data may be stored in memory at the first computing device or at the RTT server without storing any translated message. The untranslated audio is stored in memory only once to improve the speed of the translation by freeing up computational resources.

The RTT server sends the text in the first language that is detected from the native language of the first computing device and an indication of the second language to a translation server at time step T4. Alternatively, the text may be translated at the RTT server. The translated text (e.g., English to French) is transmitted back to the RTT server at time step T5. The translated text is not stored at the RTT server. At time step T6, the RTT server converts the text to audio and transmits the audio to the first computing device of the first user U1.

At time step T7A, the first computing device transmits the translated audio to the other computing device of the other user Uother. The translated audio is output at the other computing device at time step T7B. In response to the output at time step T7B, the other user Uother speaks into the other computing device in the second language at time step T8A. The audio from the other user's (Uother's) speech is transmitted to the RTT server at time step T8B and stored in the RTT server. At time step T9, the RTT server sends the audio from the other user Uother to the voice to text server to be converted to text. The text of the other user Uother is sent back to the RTT server at time T10.

At time step T11, the RTT server sends the text of the other user Uother, an indication of the first language, and an indication of the second language to the translation server. Alternatively, the text may be translated at the RTT server. The translated text (e.g., French to English) is transmitted back to the RTT server at time step T12. At time step T13, the RTT server converts the text to audio and transmits the audio to the first computing device where the translated audio is output to the first user U1. The process is then repeated, starting at time step T1B.

Aspects of the present disclosure improve latency and free up computing resources by only storing the untranslated message once without storing the translated message from the translation server.

Aspects of the present disclosure are not limited to translating voice communications. In one configuration, a text conversation may be translated. The text translation may operate similar to the voice translation. That is, rather than receiving voice, which is converted to text for the translation, the text translation receives text via user input. The translation follows the process of the voice translation. Rather than outputting translated audio, the text translation outputs translated text.

Figure 6:
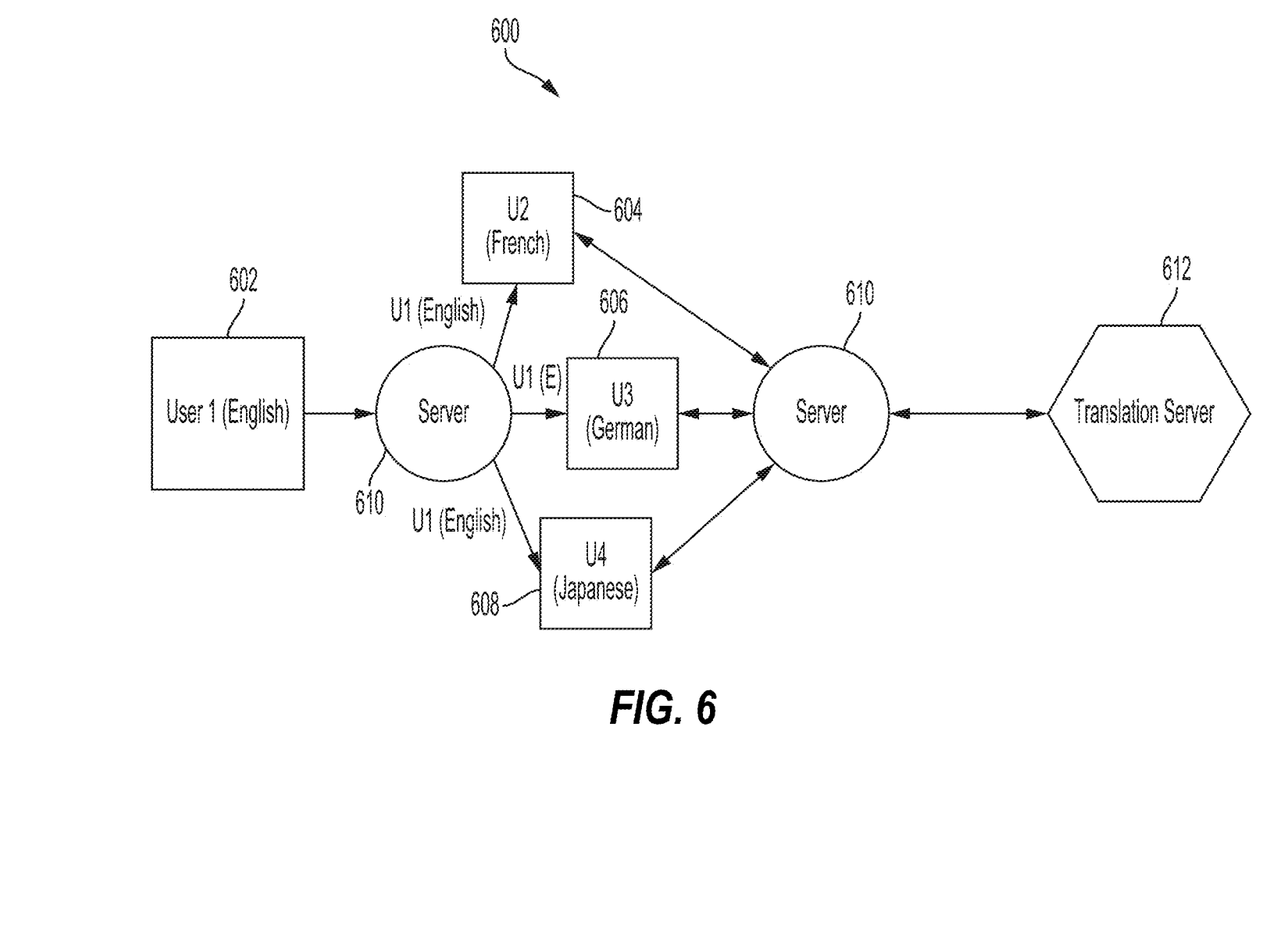
FIG. 6 illustrates a system for translating a phone call between multiple users, according to aspects of the present disclosure.

FIG. 6 illustrates a system 600 for translating a text conversation (e.g., chat) between multiple users, according to aspects of the present disclosure. For illustrative purposes, some of the labeling of the devices and features of FIG. 6 are similar to those of FIGS. 4 and 5. The system 600 illustrates a real-time chat translation system where multiple computing devices are communicating with each other.

The system 600 includes a first computing device 602 associated with the first user U1, a second computing device 604 associated with the second user U2, a third computing device 606 associated with a third user U3, and a fourth computing device 608 associated with a fourth user U4. The system 600 further includes an RTT server 610 and a translation server 612 in communication with the RTT server 610. The server 610 is split into two for illustrative purposes.

As shown in FIG. 6, the first user U1 is communicating with the second user U2, the third user U3, and the fourth user U4. For example, the first user U1, the second user U2, the third user U3, and the fourth user U4 may be communicating in a chat room. Each of the first user U1, the second user U2, the third user U3, and the fourth user U4 are communicating in different languages. For example, the first user U1 is communicating in English, the second user U2 is communicating in French, the third user U3 is communicating in German, and the fourth user is communicating in Japanese.

The first user U1 communicates with each of the second user U2, the third user U3, and the fourth user U4 in English via an input device (e.g., keyboard) of the first computing device 602, such as a mobile phone. In one aspect, the text input by the first user U1 is transmitted from the first computing device 602 to the RTT server 610. In contrast to conventional systems, the RTT server 610 does not immediately translate the text to a specific language or immediately forward the text to the translation server 612 for translation.

In example of FIG. 6, had the users U1-U4 been communicating via voice, the audio of the first user U1 would be converted to text at the first computing device 602. The converted text would then be transmitted to the RTT server 610. Aspects of the present disclosure are not limited to all users communicating via text or voice. The users may communicate via a combination of voice and text. That is, one user may communicate via voice while another user may communicate via text.

Translating the text of the first user U1 to each language of the other users (U2-U4) simultaneously is undesirable because it usurps significant computational resources, in terms of storage, processing power, and latency. To improve the translation process, the RTT server 610 sends the English message to each recipient (e.g., users U2, U3, and U4). This feature improves latency because it ensures that the translation for each of the users at the translation server 612 occurs at different times. Additionally, by sending the untranslated message to the RTT server 610, each device may remain unaware of the other users' U1-U4 native language. As such, the resource use of each user's device may be further reduced.

Each of the recipients (e.g., users U2, U3, and U4) then sends the received English message in conjunction with an indication of their respective detected languages back to the RTT server 610 for translation. For example, the second user U2 receives the English message. Upon receipt of the English message, the second user U2 sends the message to the RTT server 610 along with the indication of the second user's (U2's) language (e.g., French). The language of the second user U2 is detected based on the native language set for second computing device 604.

The message from each of the users (U2-U4) are received by the RTT server 610 and the translation server 612 at different times or are staggered due to different processing times of the computing devices 604, 606 and 608. The time differences are too small (e.g., milliseconds) to be noticed by the human ear. As a result, the user perceives real-time conversation with the other user. The RTT server 610 then forwards the indication of the respective languages at different times to the translation server 612 indicating that the message should be translated from English to the respective language of the other users (U2-U4). The English message may only be forwarded once to the translation server 612 to free up computational resources. The translation server 612 returns the respective translated messages from the different users at different times to the RTT server 610, which then passes the translated message at different times to the users (e.g., the second computing device 604 associated with the second user U2). The second computing device 604 associated with the second user U2 then outputs the translated text to the second user U2. In this example, if the second user U2 is engaged in a voice conversation, the second computing device would convert the text of the translated message to audio and output the translated audio. The process repeats for the remaining users (e.g., U3 and U4).

Translating the message to the different languages of the users at different times frees up computational resources at both the translation server 612 and the RTT server, thereby improving latency of the translation.

Figure 7:
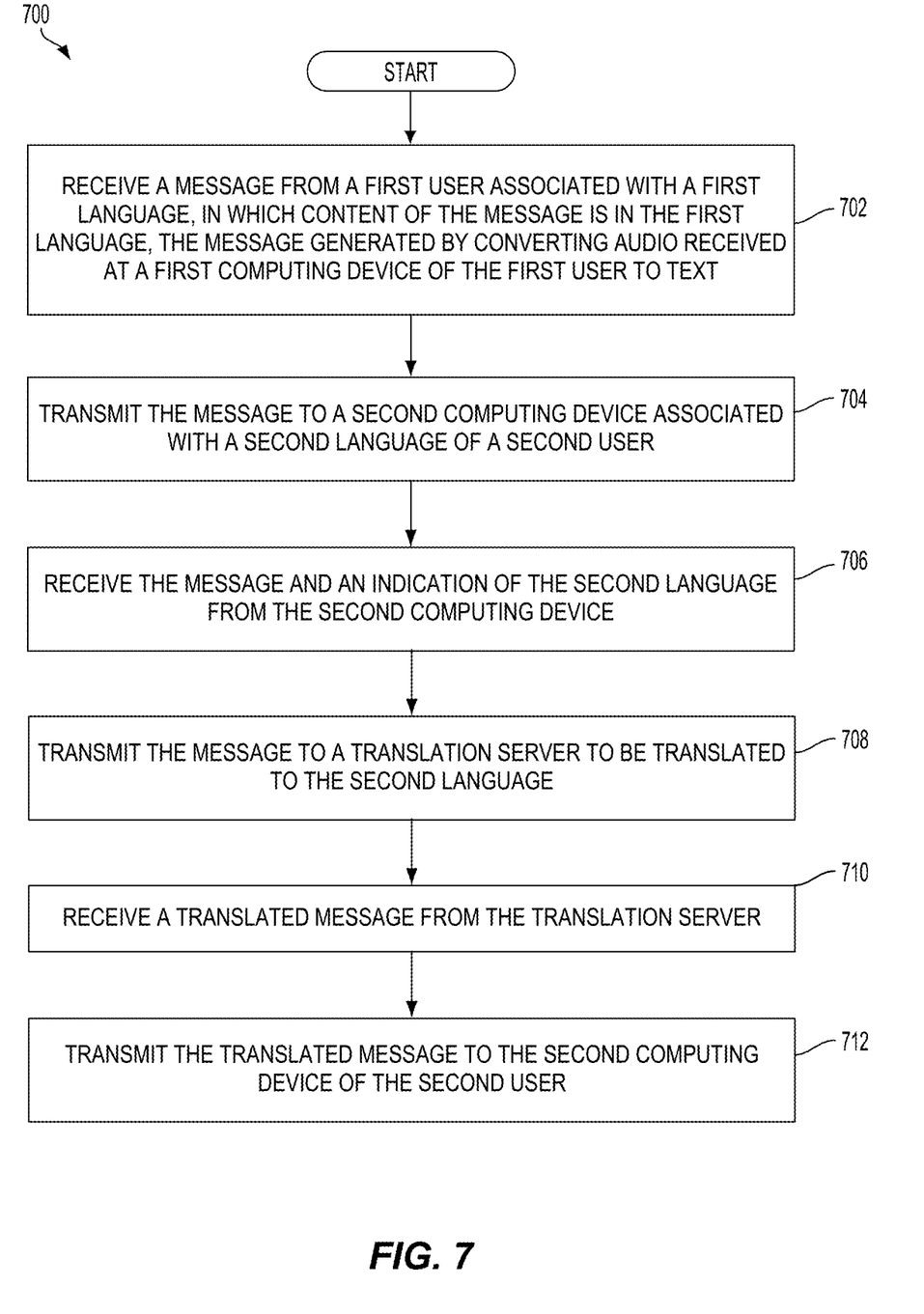
FIG. 7 depicts a simplified flowchart of a method for translating messages between users, according to aspects of the present disclosure.

FIG. 7 depicts a simplified flowchart of a method for translating messages between users. At block 702, a message from a first user associated with a first language is received at the RTT server, in which content of the message is in the first language. The message is generated by converting audio received at a first computing device of the first user to text. At block 704, the message is transmitted, by the RTT server, to a second computing device associated with a second language of a second user.

At block 706, the message and an indication of the second language from the second computing device is received at the RTT server. At block 708, the message is transmitted, by the RTT server, to a translation server to be translated to the second language. At block 710, the RTT server receives a translated message from the translation server. At block 712, the RTT server transmits the translated message to the second computing device of the second user.

Figure 8:
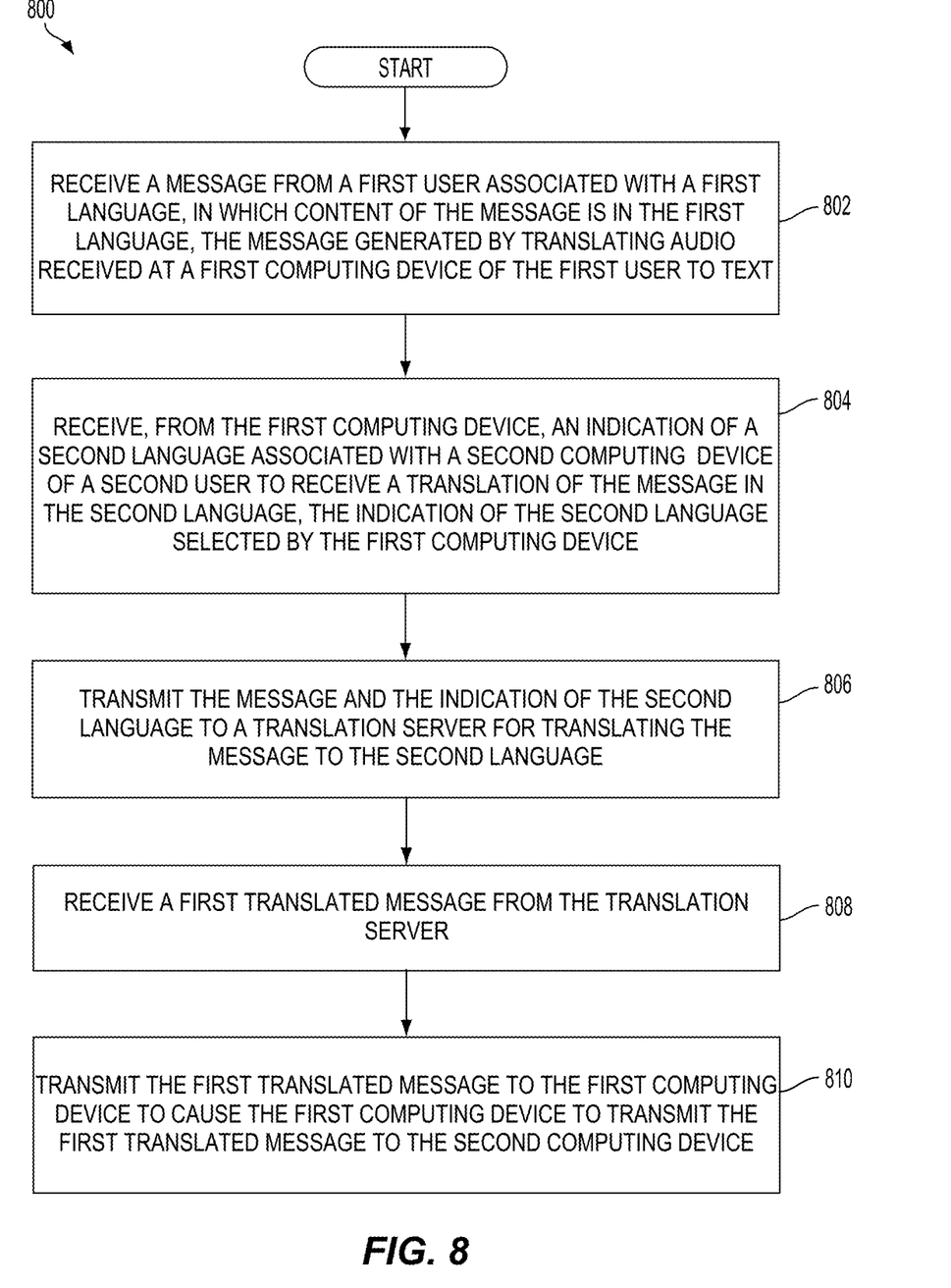
FIG. 8 depicts a simplified flowchart of a method for translating messages between users, according to aspects of the present disclosure.

FIG. 8 depicts a simplified flowchart of a method 800 for translating messages between users. At block 802, a message from a first user associated with a first language is received by the RTT server. Content of the message is in the first language. The message is generated by translating audio received at a first computing device of the first user to text. At block 804, the RTT server receives, from the first computing device, an indication of a second language associated with a second computing device of a second user to receive a translation of the message in the second language. The indication of the second language is selected by the first computing device.

At block 806, the message and the indication of the second language is transmitted by the RTT server to a translation server for translating the message to the second language. At block 808, the RTT server receives a first translated message from the translation server. At block 810, the RTT server transmits the first translated message to the first computing device to cause the first computing device to transmit the first translated message to the second computing device.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include an RTT server having signals indicative of instructions and data. The instructions and data are configured to cause one or more processors to implement the functions outlined in the claims.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:
1. A method for real time translating of messages between users, comprising:
receiving a message from a first user associated with a first language, in which content of the message is in the first language;
receiving, from a first computing device, an indication of a second language associated with a second computing device of a second user, the receiving the indication occurring prior to origination of the message;
detecting the first language from device settings;
determining whether to transmit the message to a translation server after each word or after each phrase of the message based on the detected first language;
transmitting the indication of the second language to the translation server;
transmitting the message to the translation server after each word or after each phrase based on the determining for real time translating of the message to the second language;
receiving a first translated message from the translation server; and
transmitting the first translated message to the first computing device, the first translated message intended to be transmitted by the first computing device to the second computing device, in real time.

2. The method of claim 1, further comprising:
converting the first translated message to audio; and
transmitting the audio of the first translated message to the first computing device.

3. The method of claim 1, further comprising:
receiving audio of a response from the second user, a duplicate of the audio of the response from the second user stored in memory of the first computing device;
transmitting text of the audio of the response from the second user, an indication of the first language, and an indication of the second language to the translation server;
receiving a second translated message in the first language from the translation server; and
transmitting audio of the second translated message to the first computing device of the first user.

4. An apparatus for translating messages between users in real time, the apparatus comprising:
a memory; and
at least one processor coupled to the memory, the at least one processor configured:
to receive a message from a first user associated with a first language, in which content of the message is in the first language;
to receive, from a first computing device, an indication of a second language associated with a second computing device of a second user, the receiving the indication occurring prior to origination of the message;
to detect the first language from device settings;
to determine whether to transmit the message to a translation server after each word or after each phrase of the message based on the detected first language;
to transmit the indication of the second language to the translation server;
to transmit the message to the translation server after each word or after each phrase based on the determining for real time translating of the message to the second language;
to receive a first translated message from the translation server; and
to transmit the first translated message to the first computing device, the first translated message intended to be transmitted by the first computing device to the second computing device, in real time.

5. The apparatus of claim 4, in which the at least one processor is further configured:
to convert the first translated message to audio; and
to transmit the audio of the first translated message to the first computing device.

6. The apparatus of claim 4, in which the at least one processor is further configured:
to receive audio of a response from the second user, a duplicate of the audio of the response from the second user stored in memory of the first computing device;
to transmit text of the audio of the response from the second user, an indication of the first language, and an indication of the second language to the translation server;
to receive a second translated message in the first language from the translation server; and
to transmit audio of the second translated message to the first computing device of the first user.

7. A method for translating of messages between users, comprising:
receiving, at a first time, an untranslated message from a first user associated with a first language, in which content of the untranslated message is in a source language;
receiving, from the first user, an indication of the first language from settings of a device of the first user;
determining whether to transmit the message to a translation server after each word or after each phrase of the message based on the indication of the first language;
transmitting the indication of the first language to the translation server;
transmitting the untranslated message to the translation server after each word or after each phrase based on the determining for translating of the untranslated message into the first language;
receiving, at a second time that is different from the first time, the untranslated message from a second user associated with a second language;
receiving, from the second user, an indication of the second language;
transmitting the untranslated message and the indication of the second language to the translation server for translating of the untranslated message into the second language, at a third time different from when transmitting the untranslated message and the indication of the first language to the translation server;
receiving a first translated message from the translation server in the first language;
receiving a second translated message from the translation server in the second language;
transmitting the first translated message to the first user; and
transmitting the second translated message to the second user.

8. An apparatus for translating messages between users, the apparatus comprising:
a memory; and
at least one processor coupled to the memory, the at least one processor configured:
to receive, at a first time, an untranslated message from a first user associated with a first language, in which content of the message is in a source language;
to receive, from the first user, an indication of the first language from settings of a device of the first user;
to determine whether to transmit the message to a translation server after each word or after each phrase of the message based on the indication of the first language;
to transmit the indication of the first language to the translation server;

to transmit the untranslated message to the translation server after each word or after each phrase based on the determining for translating of the untranslated message into the first language;

to receive, at a second time that is different from the first time, the untranslated message from a second user associated with a second language;

to receive, from the second user, an indication of the second language;

to transmit the untranslated message and the indication of the second language to the translation server for translating of the untranslated message into the second language, at a third time different than when transmitting the untranslated message and the indication of the first language to the translation server;

to receive a first translated message from the translation server in the first language;

to receive a second translated message from the translation server in the second language;

to transmit the first translated message to the first user; and to transmit the second translated message to the second user.

* * * * *